(12) United States Patent
Chung

(10) Patent No.: US 12,332,685 B2
(45) Date of Patent: Jun. 17, 2025

(54) DEVICE STANDS

(71) Applicant: Hewlett-Packard Development Company, L.P., Spring, TX (US)

(72) Inventor: Tien Liang Chung, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 137 days.

(21) Appl. No.: 18/007,338

(22) PCT Filed: Jul. 31, 2020

(86) PCT No.: PCT/US2020/044365
§ 371 (c)(1),
(2) Date: Jan. 30, 2023

(87) PCT Pub. No.: WO2022/025907
PCT Pub. Date: Feb. 3, 2022

(65) Prior Publication Data
US 2023/0266789 A1  Aug. 24, 2023

(51) Int. Cl.
*G06F 1/16*  (2006.01)

(52) U.S. Cl.
CPC .......... *G06F 1/1601* (2013.01); *G06F 1/1607* (2013.01); *G06F 1/1654* (2013.01); *G06F 1/1656* (2013.01); *G06F 1/1679* (2013.01)

(58) Field of Classification Search
CPC .......... G06F 1/1601; G06F 2200/1612; G06F 1/1607; G06F 1/1654; G06F 1/1656; G06F 1/1679; F16M 2200/08; F16M 11/04; F16M 11/42; F16M 11/041; Y10S 248/918; Y10S 248/917; Y10S 345/905; H05K 5/0221
See application file for complete search history.

(56) References Cited

U.S. PATENT DOCUMENTS

| | | | | |
|---|---|---|---|---|
| 5,144,290 A * | 9/1992 | Honda | ........... | G06F 1/1681 345/905 |
| 5,229,920 A * | 7/1993 | Spaniol | ........... | G06F 1/1679 361/679.55 |
| 5,632,463 A * | 5/1997 | Sung | ........... | F16M 11/126 248/371 |
| 6,381,125 B1 * | 4/2002 | Mizoguchi | ........... | G06F 1/16 361/678 |
| 6,710,828 B2 * | 3/2004 | Ma | ........... | G02F 1/133308 349/60 |

(Continued)

FOREIGN PATENT DOCUMENTS

RU  182203 U1  8/2018

*Primary Examiner* — Rockshana D Chowdhury
*Assistant Examiner* — Martin Antonio Asmat Uceda
(74) *Attorney, Agent, or Firm* — Quarles & Brady LLP

(57) ABSTRACT

In an example, a device stand may include a base having a plunger cavity extending into a device interface, a plunger having a sloped portion and movably disposed within the plunger cavity between a lock position and a release position, a slider having a slider ramp to engage with the sloped portion and disposed within a slide channel intersecting the plunger cavity, and a base magnet disposed on the plunger. The slider may be movable between a resting position and a depressed position. Upon the slider being moved from the resting position to the depressed position, the slider ramp may engage with the sloped portion to move the plunger from the lock position to the release position.

20 Claims, 7 Drawing Sheets

(56) References Cited

U.S. PATENT DOCUMENTS

| | | | | |
|---|---|---|---|---|
| 6,905,099 B2* | 6/2005 | Sung | ............ | F16M 11/105 248/146 |
| 6,921,057 B2* | 7/2005 | Chen | ............ | F16M 11/24 248/920 |
| 7,274,555 B2* | 9/2007 | Kim | ............ | F16M 11/046 248/920 |
| 7,274,556 B2* | 9/2007 | Chung | ............ | F16M 11/041 248/917 |
| 7,515,402 B2* | 4/2009 | Tsuo | ............ | F16M 11/28 349/60 |
| 7,573,711 B2* | 8/2009 | Kim | ............ | G06F 1/1601 248/920 |
| 7,710,510 B2* | 5/2010 | Chin | ............ | F16M 11/24 349/60 |
| 7,731,142 B2* | 6/2010 | Chen | ............ | A47B 88/43 248/244 |
| 8,079,554 B2* | 12/2011 | Sui | ............ | F16M 11/22 248/371 |
| 8,248,780 B2* | 8/2012 | Zheng | ............ | G06F 1/16 361/679.48 |
| 8,542,480 B2 | 9/2013 | Williams et al. | | |
| 8,567,733 B2* | 10/2013 | Wang | ............ | F16D 1/112 248/220.21 |
| 8,611,099 B2* | 12/2013 | Sun | ............ | H05K 7/1489 361/801 |
| 9,025,321 B2* | 5/2015 | Liang | ............ | G06F 1/1613 361/679.01 |
| 9,507,384 B2* | 11/2016 | Liang | ............ | G06F 1/1626 |
| 9,565,909 B2 | 2/2017 | Song et al. | | |
| 9,774,135 B2 | 9/2017 | Laine et al. | | |
| 10,860,066 B1* | 12/2020 | Barnard | ............ | F16M 11/041 |
| 2003/0063059 A1 | 4/2003 | Farrow et al. | | |
| 2004/0011932 A1* | 1/2004 | Duff | ............ | F16M 11/10 361/679.21 |
| 2005/0139745 A1* | 6/2005 | Liao | ............ | G06F 1/1601 248/225.21 |
| 2006/0008103 A1 | 1/2006 | Takahashi et al. | | |
| 2007/0075208 A1 | 4/2007 | Chen | | |
| 2007/0284488 A1 | 12/2007 | Kim et al. | | |
| 2008/0067314 A1* | 3/2008 | Li | ............ | F16M 11/10 248/398 |
| 2020/0084902 A1 | 3/2020 | Venkatesh et al. | | |
| 2020/0149320 A1* | 5/2020 | Pfunder | ............ | E05B 17/2011 |
| 2021/0156506 A1* | 5/2021 | Franke | ............ | F16M 11/041 |

* cited by examiner

DEVICE STANDS

BACKGROUND

Electronic devices such as computing devices may include displays. A display may be integrated into the computing device, e.g., in a notebook or all-in-one computer, or they may be a separate component for use with a computing device, e.g., a monitor for use with a desktop tower computer. Displays may include a device stand upon which the display panel, or a chassis enclosing a display panel, may be mounted so as to be placed on a work surface, e.g., a desktop.

DETAILED DESCRIPTION

As described above, electronic devices such as computing devices may include a display for use in conjunction with the computing device. In some situations, the display may be a standalone component, e.g., a display device or monitor for use with a desktop tower, and in other situations the display may be integrated into the computing device, e.g., in an all-in-one (AIO) computer. Such an integrated computing device or a standalone display device may be referred to as an electronic device and may include a display panel component. Such electronic devices may further include a display stand or device stand to support the electronic device upon a work surface, such as a desktop, or any other surface upon which the electronic device may be placed.

In some situations, the device stand may be a separate component from the electronic device and may be attached to the electronic device, or a chassis thereof, for use. This may prove to be beneficial for certain aspects of the electronic device's lifecycle, e.g., in shipping, transporting, or otherwise moving the device's location. Such device stands may often be removably attached to the electronic device using screws, bolts, pins, clips, or other standalone fasteners. Often, these fasteners are installed and removed using tools, which may be inconvenient for a user lacking such tools. Installing such fasteners to utilize the device stand may often be a cumbersome process and/or may involve trying to fit the fasteners and associated tool into hard-to-reach portions of the electronic device. Additionally, including such fasteners with the electronic device may increase overall device cost and assembly complexity.

In some situations, it may be desirable to include a removable device stand with an electronic device to aid in shipping, transporting, and/or package size, yet also enable easy and convenient attachment of the device stand to the device to improve user experience. Further, it may be desirable to decrease additional cost to the electronic device by avoiding the inclusion of standalone fasteners and tools.

Implementations of the present subject matter provide device stands for use with electronic devices. Such examples of device stands are attachable and removable from electronic devices in an easy and convenient manner and avoid the use of standalone fasteners and separate tools for such installation. Thus, such electronic devices may be transported in a smaller, more manageable package, yet still provide the advantages of having a device stand when in use.

Figure 1A:
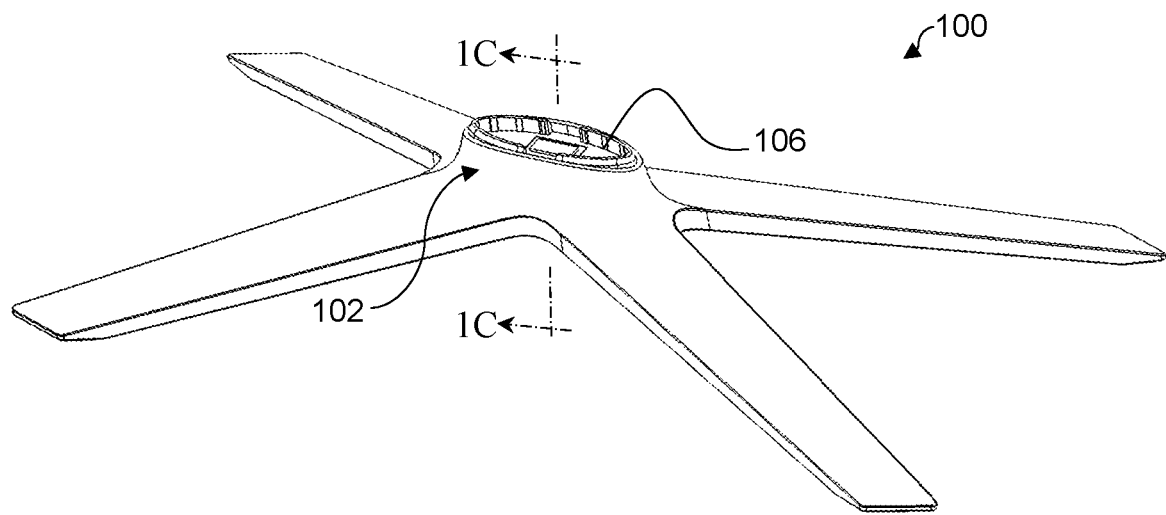
FIG. 1A is a perspective view of an example device stand.
Figure 1B:
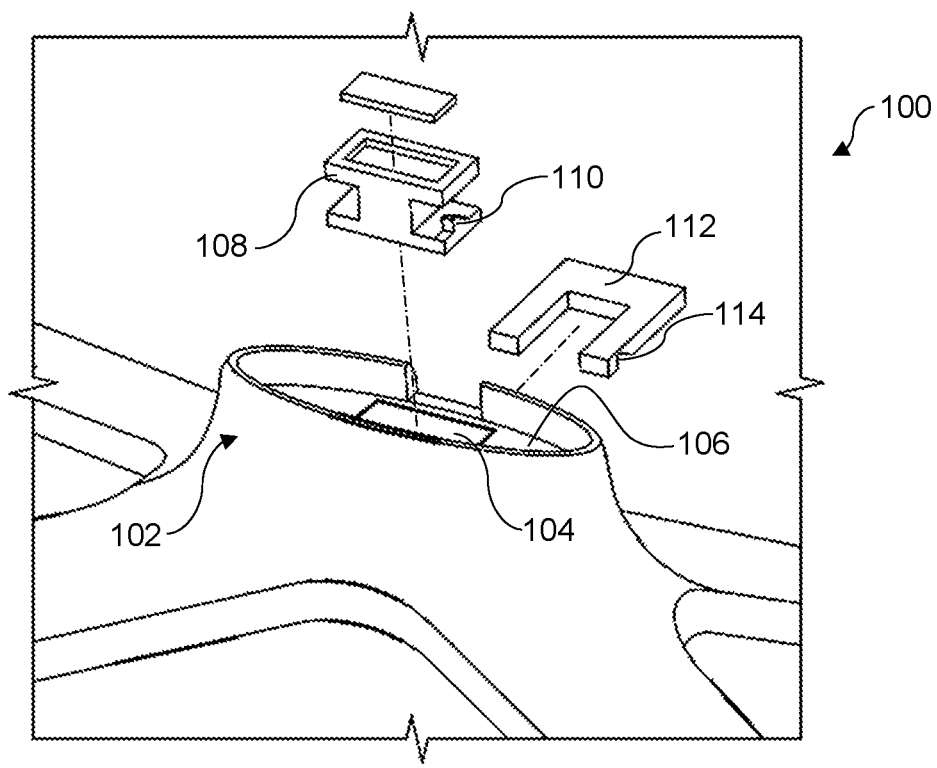
FIG. 1B is an exploded perspective view of the example device stand of FIG. 1A.

Referring now to FIG. 1A, a perspective view of an example device stand 100 is illustrated. Referring additionally to FIG. 1B, an exploded perspective view of example device stand 100 is illustrated. Device stand 100 may include a base 102 having a plunger cavity 104 extending into a device interface 106. The base 102 may be a rigid or semi-rigid structure or member to support devices engaged with the device interface 106. In other words, the base 102 may be a component attachable to, through the device interface 106, a computing or electronic device and may provide stable support to such a device and enable such devices to rest on a work surface, desktop, etc. In some implementations, the base 102 may include or may attach to a leg or plurality of legs, a stand, or another suitable component to rest on such a work surface. The device interface 106 may be a portion of the base 102 suitable to receive an electronic device or a portion thereof. In some implementations, the device interface 106 may be planar or may have another profile suitable to engage with a complementary profile of a stand interface of a device. In further implementations, the device interface 106 may be a shallow cavity, concave, or may have side support walls to engage with a stand interface to provide structural support to a device.

The plunger cavity 104 may be a channel, open shaft, crevice, or another type of opening extending into the base 102 in a vertical or substantially orthogonal direction relative to the device interface 106, or relative to a surface on which the device stand 100 may be resting. The plunger cavity 104 may have a sufficient profile, size, and/or depth to receive other components of the device stand 100, e.g., plungers, sliders, bias members, associated structural or support components or features, etc.

Figure 1C:
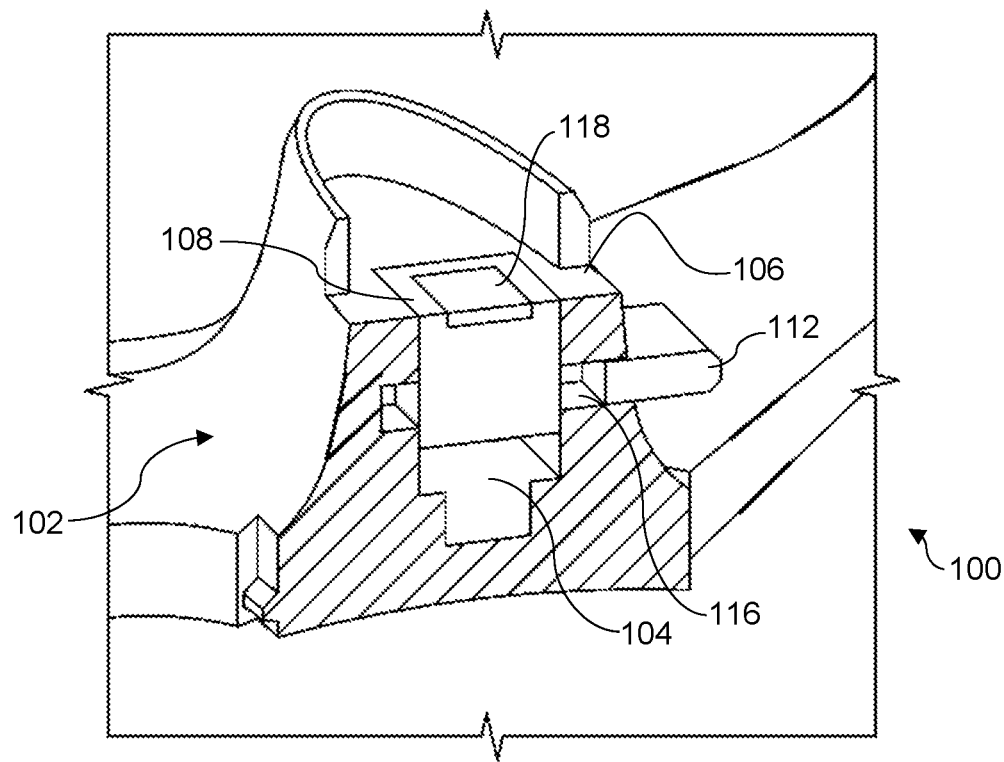
FIG. 1C is a cross-sectional view of the example device stand of FIG. 1A

Device stand 100 may further include a plunger 108 having a sloped portion 110. The device stand 100 may include a base magnet 118 disposed on or attached to the plunger 108. Referring yet additionally to FIG. 1C, a cross-sectional view of the example device stand 100 taken along view line 1C-1C of FIG. 1A is illustrated. The plunger 108 may be movably disposed within the plunger cavity between a lock position (illustrated in FIG. 1C) and a release position.

The device stand 100 may further include a slider 112 having a slider ramp 114 to engage with the sloped portion 110 of the plunger 108. The slider 112 may be disposed within a slide channel 116 intersecting the plunger cavity 104 and the slider 112 may be movable between a resting position (illustrated in FIG. 1C) and a depressed position. In some examples, the slide channel 116 may be a shaft, slot, or other type of opening extending into the base 102 so as to intersect the plunger cavity 104 in a transverse manner. The slide channel 116 may be sized sufficiently and/or have a sufficient depth so as to be able to receive the slider 112 and accommodate an engagement between the slider 112 and the plunger 108. In some implementations, the slide channel may extend all the way through a width or thickness of the base 102. In other implementations, the slide channel 116 may intersect the plunger cavity 104 in an orthogonal or perpendicular manner.

In some examples, upon the slider 112 being moved from the resting position to the depressed position, the slider ramp 114 may slide along, press against, or otherwise engage with the sloped portion 110 of the plunger 108 to move the plunger 108 from the lock position to the released position, as is discussed in further detail below.

Figure 2A:
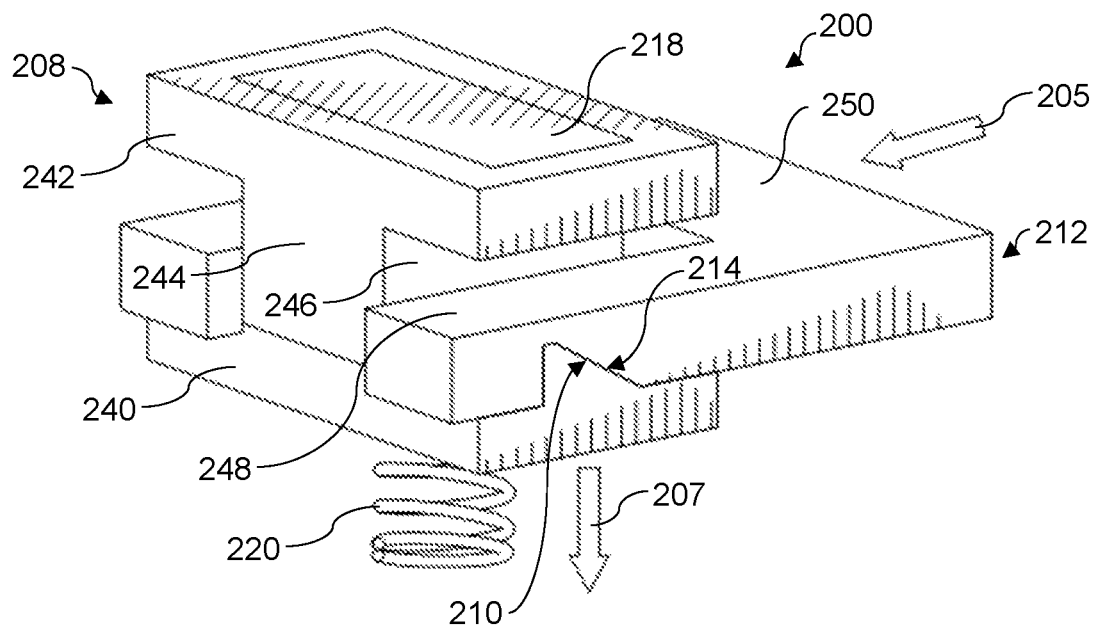
FIG. 2A is a perspective view of another example device stand.

Referring now to FIG. 2A, a perspective view of another example device stand 200 is illustrated. Example device stand 200 may be similar to other example device stands described above. Further, the similarly-named elements of example device stand 200 may be similar in function and/or structure to the respective elements of other example device stands, as they are described above. Example device stand 200 may include a base, similar to base 102, yet it is not shown in FIG. 2A for clarity.

Device stand 200 may include a plunger 208 and a slider 212 movably engaged with the plunger 208. In some examples, the slider 212 may be disposed in an orthogonal or perpendicular orientation relative to the plunger 208. In other examples, the slider 212 may be disposed in another type of transverse orientation other than precisely orthogonal relative to the plunger 208 such that a lateral movement of the slider 212, e.g., along example direction 205, or a horizontal component of such movement, is transferred into a transverse movement of the plunger 208, or a component of such a movement of the plunger 208 being in a vertical orientation, e.g., along example direction 207. Stated differently, the slider 212 and the plunger 208, while in some examples not being in perfect orthogonality to one another, may still be engaged so as to transfer movement of the slider 212 into a vertical movement (or a movement having a vertical component) of the plunger 208.

The plunger 208 may be a rigid or semi-rigid component shaped and/or sized so as to be insertable into and movable within a plunger cavity in the base. The plunger 208 may further have a sloped portion 210 extending from a portion of the plunger 208. In some examples, the sloped portion 210 may extend from the plunger 208 in a direction towards the slider 212 when the slider 212 is engaged with the plunger 208. In further examples, the plunger may have a bottom portion 240 and a top portion 242. The top portion 242 and the bottom portion 240 may be substantially planar and separated from one another so as to define one or multiple slider slots 246 through which the slider 212, or a portion thereof, may extend. In some implementations, the plunger 208 may further include a central portion 244 connecting the top portion 242 and the bottom portion 240. In some examples, the plunger 208 may have a substantially H-shaped profile, with the central portion 244 defining two slider slots 246 on either side of the central portion 244 in between the top portion 242 and the bottom portion 240. In further examples, the sloped portion 210 may be an angled protrusion extending from the bottom portion 240 into one of the slider slots 246 in order to engage with the slider 212.

The device stand 200 may further include a base magnet 218 disposed on or attached to the plunger 208. In some implementations, the base magnet 218 may be disposed on the top portion 242 of the plunger 208. The base magnet 218 may be a component constructed of a magnetic material, e.g., a ferrous material, or a material that produces a magnetic field. In other implementations, the base magnet 218 may be an electromagnet or may be formed of another material that is able to interact or be affected by a magnetic field near the base magnet 218.

The slider 212 may be a rigid or semi-rigid component having a sufficient structure and/or shape so as to engage with the plunger 208 or a portion thereof. In examples wherein the plunger 208 has a substantially H-shaped profile, the slider 212 may have a substantially U-shaped profile, or another profile having one or multiple arms 248. Each arm 248 may insertably engage with a respective slider slot 246 of the plunger 208. In some examples, the slider 212 may have a pair of arms 248 connected to each other by a core portion 250. The slider 212 may further include a slider ramp 214. The slider ramp 214 may be an angled surface that may be defined by a cutout into the slider 212. In some examples, the slider ramp 214 may be disposed in an arm 248 of the slider 212 and, when the slider 212 and plunger 208 are engaged, may be disposed next to or adjacent the sloped portion 210 of the plunger 208. In further implementations, the slider ramp 214 may have a complementary sized and/or angle so as to mate with or receive the sloped portion 210 of the plunger 208.

Figure 2B:
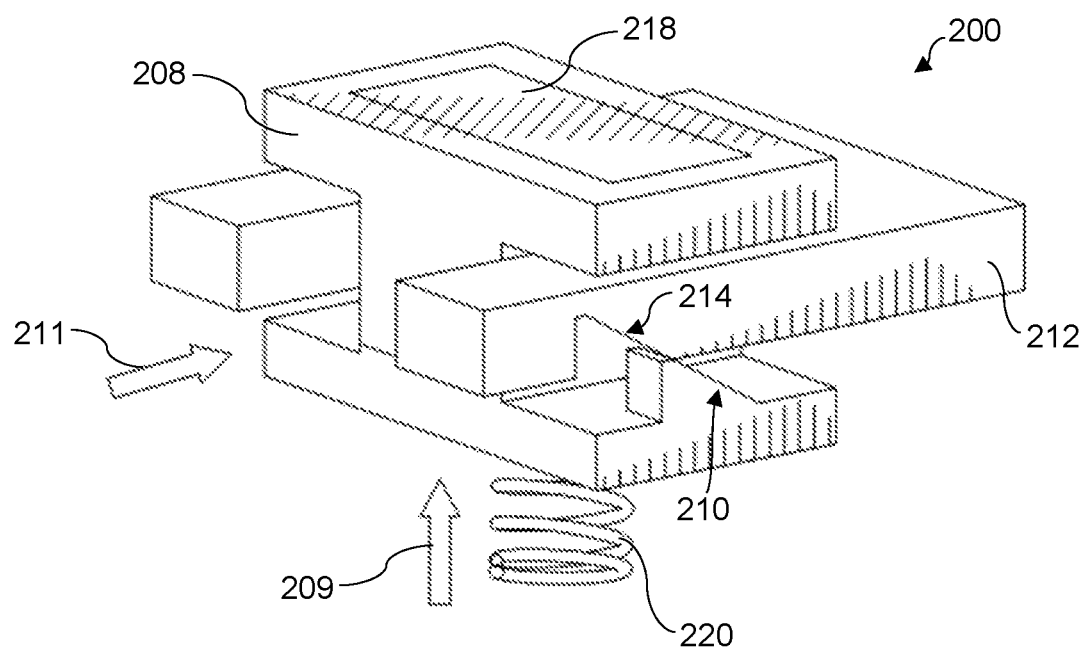
FIG. 2B is another perspective view of the example device stand of FIG. 2A.

The slider 212 and the plunger 208 may be slidable with respect to one another. For example, the slider 212, upon being moved along direction 205, e.g., by a depressing force, is to transfer such motion and such force to the plunger 208, e.g., through the engagement of the slider ramp 214 with the sloped portion 210, so as to move the plunger 208 along direction 207. In other words, by way of the angled nature of the slider ramp 214 and sloped portion 210 and the engagement between them, an external depressing force (e.g., from a user or other external factor) exerted on the slider 212 may be transferred into a plunging force exerted on the plunger 208 by the slider 212. Referring additionally to FIG. 2B, another perspective view of device stand 200 is illustrated wherein a depressing force exerted on the slider 212 has moved the slider 212 from a resting position (illustrated in FIG. 2A) to a depressed position. As such, the slider 212 has transferred such a depressing force into a plunging force exerted on the plunger 208 by way of the engagement between the slider ramp 214 and the sloped portion 210 and the plunger has moved from a lock position (illustrated in FIG. 2A) to a release position.

In some examples, the device stand 200 may include a plunger bias member 220 to urge the plunger 208 against the plunging force. The plunger bias member 220 may be a resilient component capable of elastic deformation. I.e., the plunger bias member 220 may be able to return to its starting shape and/or orientation after undergoing a deformation. The plunger bias member 220 may exert a reactive normal force proportional and opposite to the deformation and direction therefrom. In some examples, the plunger bias member 220 may be a spring such as a compression coil spring. In other examples, the plunger bias member 220 may be another type of spring.

Movement of the plunger 208 along direction 207 due to the exerting of the plunging force from the slider 212 may be against the urging of the reactive force of the plunger bias member 220 which may be, e.g., along direction 209. As such, once the depressing force is removed from the slider 212, the plunger bias member 220, and the reactive normal force thereof exerted along direction 209, may move the plunger 208 back towards the lock position. Such movement of the plunger 208 may cause the sloped portion 210 to press against the slider ramp 214 so as to transfer such movement and reactive force to the slider 212, thereby causing the slider 212 to move along direction 211 back towards the resting position.

Figure 3A:
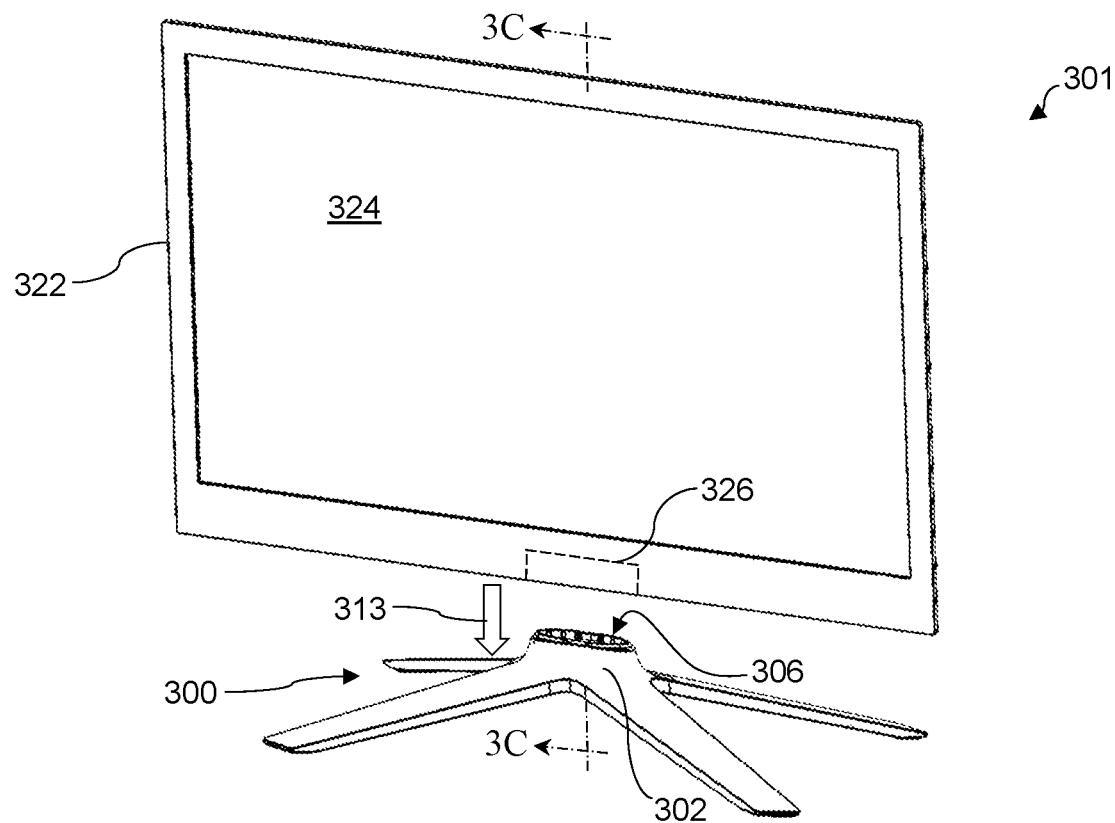
FIG. 3A is a perspective view of an example electronic device having an example device stand.

Referring now to FIG. 3A, a perspective view of an example electronic device 301 having an example device stand 300 is illustrated. Example device stand 300 may be similar to other example device stands described above. Further, the similarly-named elements of example device stand 300 may be similar in function and/or structure to the respective elements of other example device stands, as they are described above.

Electronic device 301, in some examples, may be a computing device such as a desktop or all-in-one (AIO) computer. In other examples, electronic device 301 may be a peripheral device for use with a separate computing device, e.g., a monitor or external or supplementary display device for a computing device. In other examples, electronic device 301 may be any type of electronic device that may benefit from the implementation of a removable device stand.

Electronic device 301 may include a chassis 322 having a display panel 324 disposed within or supported by the chassis 322. The chassis 322 may be a housing or support structure to mechanically support and/or protect the display panel 324 and any other internal components of the electronic device 301. The chassis 322 may be removable or detachable from the device stand 300 in order to transport and/or store the electronic device 301 in a convenient manner. The device stand 300 may have a base 302 having a device interface 306 and, when desirable to use the electronic device 301, the device interface 306 may be attached to a bottom portion of the chassis 322, e.g., to a stand interface 326 (shown in dotted lines due to its hidden nature in the present view) along direction 313.

Figure 3B:
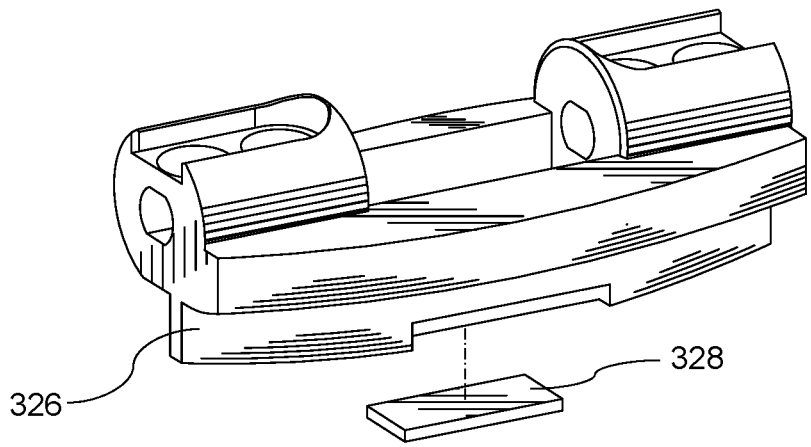
FIG. 3B is a perspective view of an example stand interface of the example electronic device of FIG. 3A.

Referring now to FIG. 3B, a perspective view of an example stand interface 326 of the example electronic device 301 is illustrated. The stand interface 326 may be a portion of the chassis 322 or a component attached fixedly or hingedly to the chassis 322. The chassis 322, or the stand interface 326 thereof, may further include a device magnet 328 disposed on the stand interface 326. In some examples, the device magnet 328 may be a component constructed of a magnetic material, e.g., a ferrous material, or a material that produces a magnetic field. In other implementations, the device magnet 328 may be an electromagnet or may be formed of another material that is able to interact or be affected by a magnetic field near the base magnet 328. The device magnet 328 may be disposed on a bottom side of the stand interface 326 such that, upon the stand interface 326 being engaged with a device interface on a device stand (e.g., device stand 300), the device magnet 328 is disposed adjacent to and is magnetically attracted to a base magnet disposed on the device interface, as described below.

Figure 3C:
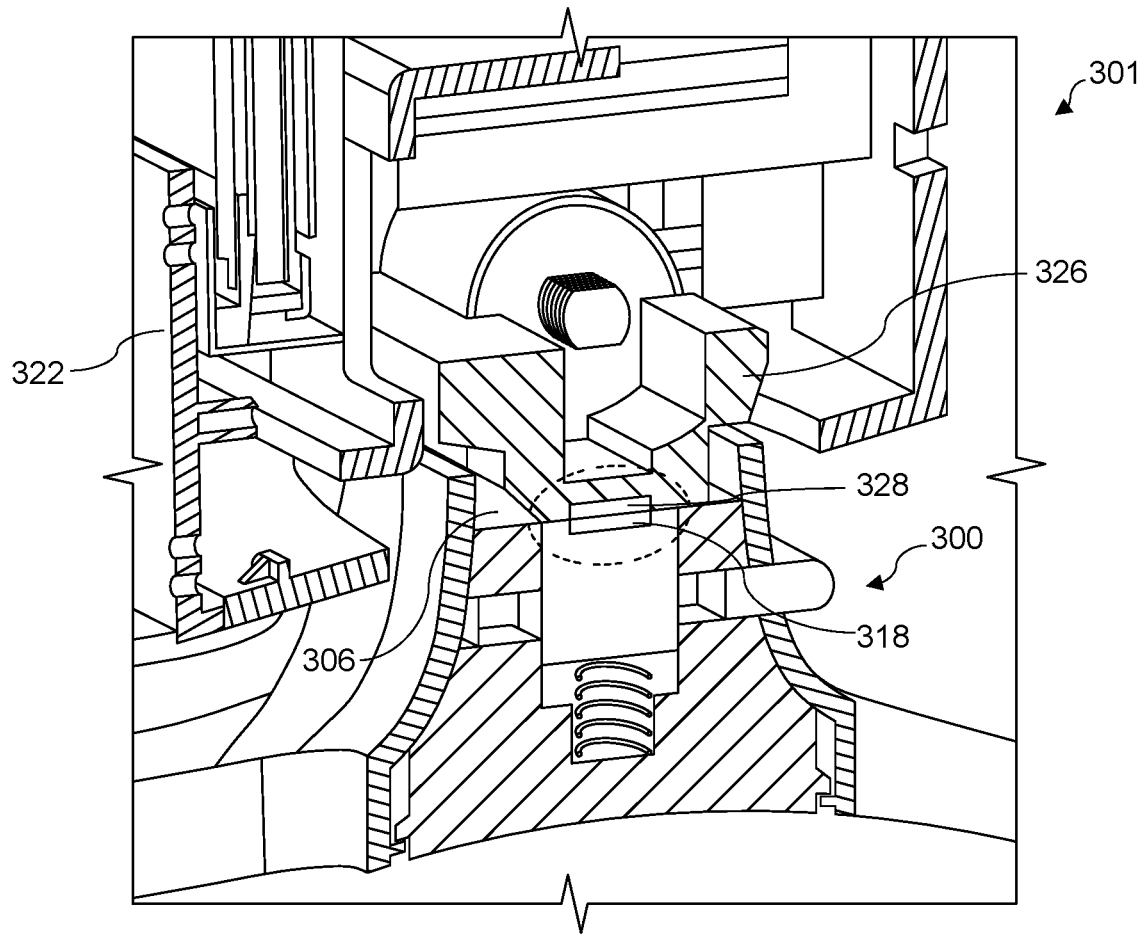
FIG. 3C is cross-sectional view of the example electronic device of FIG. 3A

Referring now to FIG. 3C, a cross-sectional view of example electronic device 301 taken along view line 3C-3C of FIG. 3A is illustrated. Chassis 322 has been attached to the device stand 300 by way of engaging the stand interface 326 of the chassis 322 with the device interface 306 of the device stand 300. The device interface 306, in some examples, may removably receive the stand interface 326 such that the stand interface 326 is inserted, at least partially, into the device interface 306 and is supported by the device interface 306. Once engaged with the device interface 306, the stand interface 326 disposes the device magnet 328 against the base magnet 318 such that the magnets are attracted to and mated against one another through magnetic attractive force to a sufficient degree that the chassis 322 is retained to the device stand 300, and the electronic device 301 may be utilized. In other words, the base magnet 318 is to magnetically engage with or attach to the device magnet 328 when the device interface 306 is fully engaged with the stand interface 326.

Figure 3D:
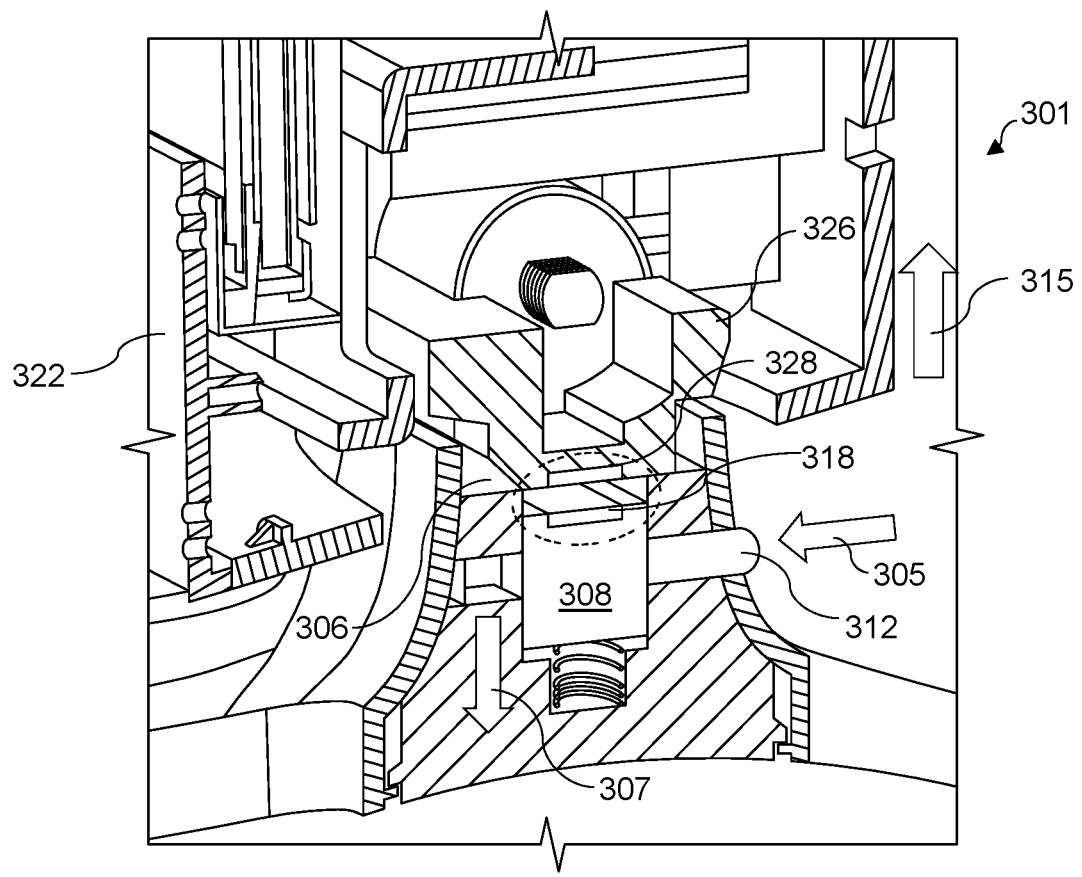
FIG. 3D is another cross-sectional view of the example electronic device of FIG. 3A.

Referring additionally to FIG. 3D, another cross-sectional view of example electronic device 301 is illustrated. Device stand 300 may include a plunger 308 disposed in a plunger cavity extending vertically into the device interface 306. The plunger 308 may be movable or slidable between a lock position (illustrated in FIG. 3C) and a release position (illustrated in FIG. 3D). The device stand 300 may further include a slider 312 disposed within a slide channel transversely intersecting the plunger cavity. The slider 312 may be movable or slidable between a resting position (illustrated in FIG. 3C) and a depressed position (illustrated in FIG. 3D). The slider 312, as described above, may include a slider ramp (not shown) to engage with a sloped portion (not shown) of the plunger 308 upon the slider 312 being moved to the depressed position.

In some examples, upon the slider 312 being moved to the depressed position along direction 305, the slider ramp is to transfer the depressing force on the slider 312 into a plunging force on the plunger 308 through pressing on the sloped portion so as to lower the plunger 308 through the plunger cavity, e.g., along direction 307. Upon the plunger 308 being lowered by the plunging force, the base magnet 318 is thus separated from the device magnet 328 so as to decrease the magnitude of the magnetic attractive force between them. The slider 312, upon being fully disposed in the depressed position, fully disposes the plunger 308 in the release position. When the plunger 308 is fully disposed in the release position, the base magnet 318 and the device magnet 328 are separated enough such that the magnetic attractive force is decreased to a sufficient degree such that the chassis 322, or the stand interface 326 thereof, can be removed from the device stand 300, or the device interface 306 thereof, e.g., along direction 315.

Figure 4A:
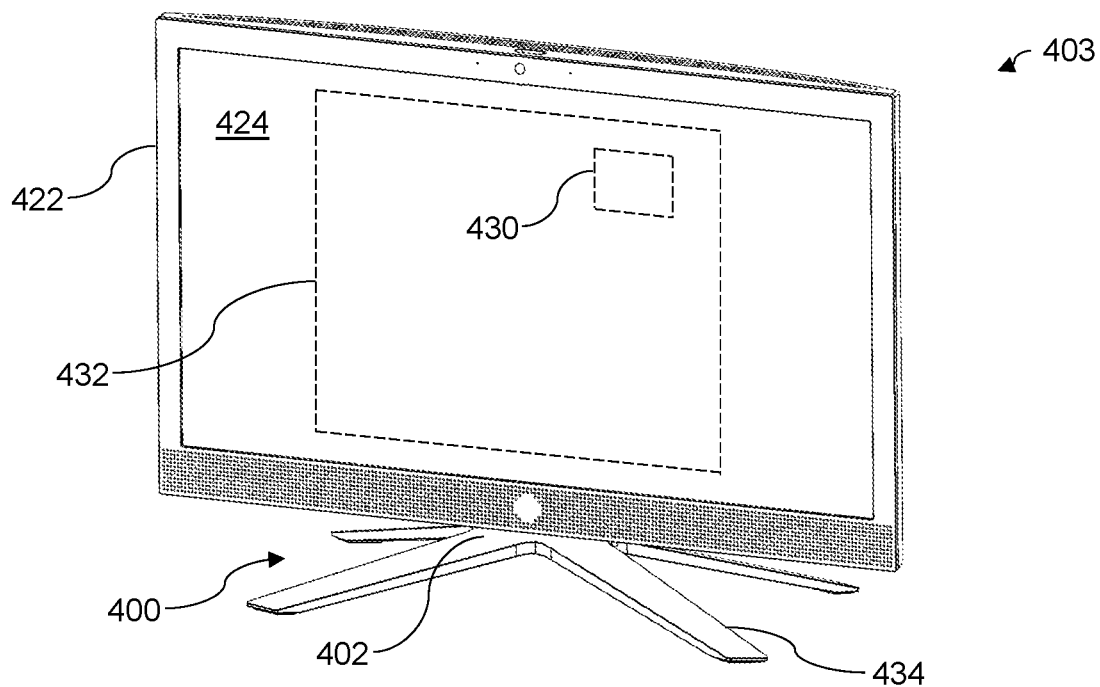
FIG. 4A is a perspective view of an example all-in-one (AIO) computer having an example device stand.

Referring now to FIG. 4A, a perspective view of an example AIO computer 403 having an example device stand 400 is illustrated. Example device stand 400 may be similar to other example device stands described above. Further, the similarly-named elements of example device stand 400 may be similar in function and/or structure to the respective elements of other example device stands, as they are described above. Similarly, components of AIO computer 403 sharing similar names to components of electronic device 301 may be similar in structure and/or function in some examples.

The AIO computer may include a chassis 422 to house, support, and/or protect computing components disposed within. The chassis 422 may have a stand interface with a device magnet to engage with a base magnet of a device interface of the device stand 400. In order to assemble the chassis 422 onto the device stand 400, the stand interface may be inserted into the device interface such that the magnetic attraction between the base magnet and the device magnet retains the chassis 422 to the device stand 400.

The AIO computer may include a system board 432, e.g., a motherboard, having a processor or processing resource 430. Processor 430 may be able to execute non-transitory machine-readable instructions stored in a memory or storage of the AIO computer. The AIO computer may further include a display panel 424 disposed within the chassis 422, the display panel 424 to output a graphical user interface to a user.

The device stand 400 may include a plurality of legs 434 upon which the AIO computer is to rest when on a work surface such as a desktop. The device stand 400 may also include a base 402 attached to the plurality of legs 434 or as a unitary component with the plurality of legs 434. In some examples, the device stand 400 may include a number of legs 434 other than as shown in FIG. 4A.

Figure 4B:
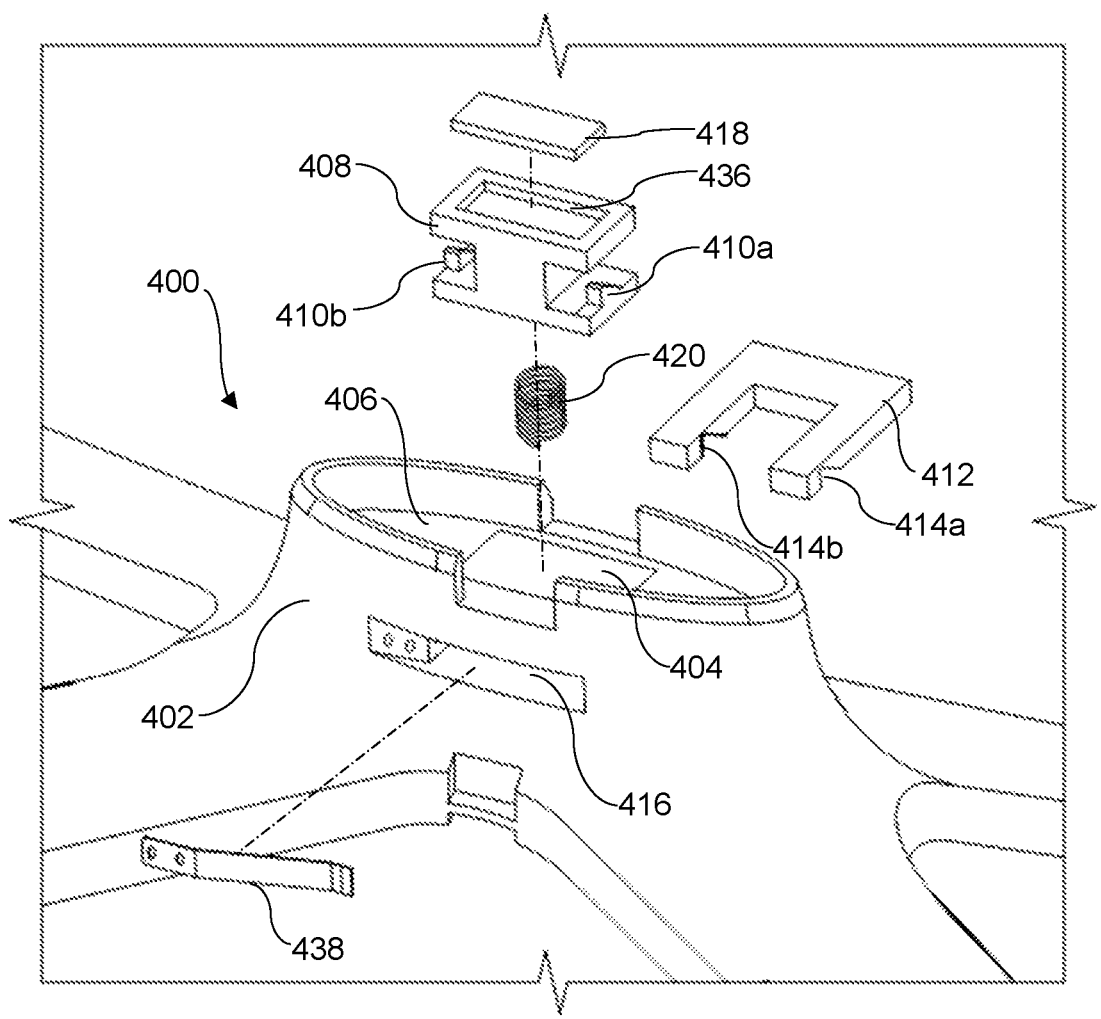
FIG. 4B is an exploded perspective view of the example device stand of FIG. 4A.

Referring now to FIG. 4B, an exploded perspective view of example device stand 400 is illustrated. The device stand 400 may include a base 402 having a device interface 406 to removably receive the stand interface so as to removably attach the chassis 422 to the device stand 400. The base 402 may further include a plunger cavity 404 extending orthogonally into the device interface 406 and a slide channel 416 transversely intersecting the plunger cavity 404.

The device stand 400 may further include an H-shaped plunger 408 having a first sloped portion 410a and a second sloped portion 410b. The plunger 408 may be disposed and vertically movable within the plunger cavity 404 between a lock position and a release position. The device stand 400 may further include a U-shaped slider 412 having a first slider ramp 414a disposed on a first arm and a second slider ramp 414b disposed on a second arm to engage with the first and second sloped portion 410a and 410b, respectively. The slider 412 may be slidably disposed within the slide channel 416 and movable between a resting position and a depressed position. The device stand 400 may further include a base magnet 418 disposed in a magnet cradle 436 on an interface side of the plunger 408 so as to be substantially flush with the device interface 406 when the plunger 408 is in the lock position and to be separated from the device interface 406 when the plunger 408 is in the release position.

In some examples, the device stand 400 may further include a plunger bias member 420 to urge the plunger 408 towards the lock position and a slider bias member 438 to urge the slider towards the resting position. The slider bias member 438 may be a resilient member capable of returning to a starting shape or orientation after undergoing a deformation and of exerting a reactive normal force in response and proportional to such a deformation. In some examples, the slider bias member 438 may be a leaf spring and in other examples, the slider bias member 438 may be another type of spring.

Figure 4C:
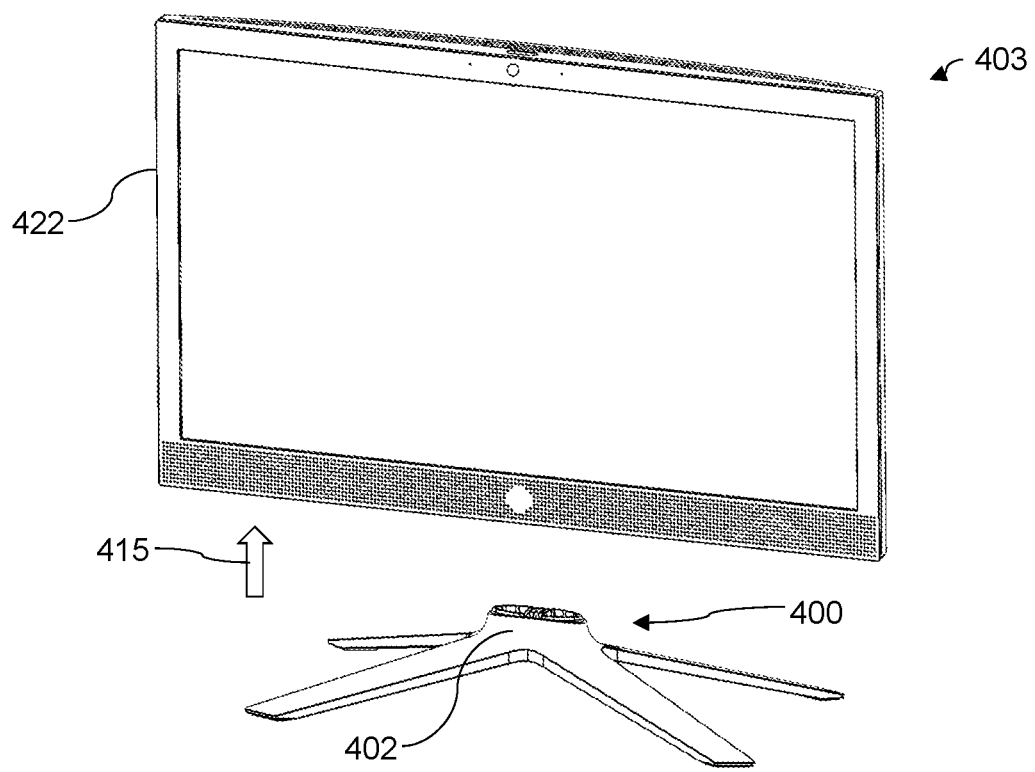
FIG. 4C is another perspective view of the example device stand of FIG. 4A.

Referring now to FIG. 4C, another perspective view of example AIO computer 403 is illustrated. Upon the slider 412 being moved from the resting position to the depressed position, against the urging of the slider bias member 438, the engagement between the first and second sloped portion 410a and 410b and the first and second slider ramp 414a and 414b, respectively, may transfer such motion into a plunging motion on the plunger. Such a plunging motion may move the plunger 408 from the lock position to the release position, thereby separating the base magnet 418 from the device magnet and allowing the chassis 422 to be removed from the device stand 400, e.g., along direction 415.

What is claimed is:

1. A device stand, comprising:
a base having a plunger cavity extending into a device interface;
a plunger having a sloped portion and movably disposed within the plunger cavity between a lock position and a release position;
a slider having a slider ramp to engage with the sloped portion and disposed within a slide channel intersecting the plunger cavity, the slider movable between a resting position and a depressed position,
wherein upon the slider being moved from the resting position to the depressed position, the slider ramp is to engage with the sloped portion to move the plunger from the lock position to the release position; and
a base magnet disposed on the plunger.

2. The device stand of claim 1, wherein a depressing force exerted on the slider to move the slider to the depressed position is transferred from the slider into a plunging force exerted on the plunger through the interface between the slider ramp and the sloped portion in order to move the plunger to the release position.

3. The device stand of claim 1, wherein the slider is disposed in a transverse orientation relative to the plunger.

4. The device stand of claim 1, wherein the slider is disposed in an orthogonal orientation relative to the plunger.

5. The device stand of claim 1, further comprising a slider bias member to urge the slider towards the resting position.

6. The device stand of claim 1, further comprising a plunger bias member to urge the plunger towards the lock position.

7. The device stand of claim 1, wherein the device interface is to removably engage with a stand interface of an electronic device and the base magnet is to magnetically engage with a device magnet disposed on the stand interface when the device interface is fully engaged with the stand interface.

8. An electronic device, comprising:
a chassis, comprising:
a display panel;
a stand interface; and
a device magnet disposed on the stand interface; and
a device stand, comprising:
a base having a device interface to removably receive the stand interface;
a plunger disposed in a plunger cavity extending vertically into the device interface, the plunger movable between a lock position and a release position;
a slider disposed within a slide channel transversely intersecting the plunger cavity, the slider slidable between a resting position and a depressed position and having a slider ramp to engage with a sloped portion of the plunger upon being moved to the depressed position; and
a base magnet disposed on an interface side of the plunger,
wherein the device magnet is to engage with the base magnet upon the stand interface being inserted into the device interface such that the chassis is retained to the device stand through magnetic attractive force.

9. The electronic device of claim 8, wherein upon the slider being moved to the depressed position, the slider ramp is to transfer a depressing force on the slider into a plunging force on the plunger through pressing on the sloped portion so as to lower the plunger through the plunger cavity to separate the base magnet from the device magnet so as to decrease the magnitude of the magnetic attractive force between them.

10. The electronic device of claim 9, wherein upon the base magnet being separated from the device magnet, the magnetic attractive force is decreased such that the stand interface is able to be separated from the device interface such that the chassis can be removed from the device stand.

11. The electronic device of claim 8, wherein the electronic device is a display device for a computing device.

12. An all-in-one (AIO) computer, comprising:

a processor disposed on a system board;
a chassis having a device magnet disposed on a stand interface and a display panel disposed within the chassis; and
a device stand, comprising:
   a base, comprising:
      a device interface to removably receive the stand interface so as to removably attach the chassis to the device stand;
      a plunger cavity extending orthogonally into the device interface; and
      a slide channel transversely intersecting the plunger cavity;
   a plunger having a sloped portion and disposed and vertically movable within the plunger cavity between a lock position and a release position;
   a slider having a slider ramp and disposed within the slide channel and slidable between a resting position and a depressed position, the slider ramp to engage with the sloped portion such that the slider moves the plunger from the lock position to the release position upon a depressing force moving the slider from the resting position to the depressed position; and
   a base magnet disposed on the plunger so as to be substantially flush with the device interface when the plunger is in the lock position and separated from the device interface when the plunger is in the release position.

13. The AIO computer of claim 12, wherein the base magnet is to magnetically attach to the device magnet upon the chassis being attached to the device stand so as to retain the chassis on to the device stand.

14. The AIO computer of claim 13, wherein the base magnet is to separate from the device magnet upon the plunger being moved to the release position so as to decrease the magnetic attraction between the device magnet and the base magnet to allow the chassis to be removed from the device stand.

15. The AIO computer of claim 12, further comprising a plunger bias member, wherein upon removal of the depressing force from the slider, the plunger bias member is to exert a normal reactive force on the plunger to move the plunger from the release position to the lock position and, through the engagement between the sloped portion and slider ramp, move the slider from the depressed position to the resting position.

16. The device stand of claim 1, wherein the plunger has an H-shaped profile, comprising a top portion, a bottom portion, and a central portion in between the top portion and the bottom portion.

17. The device stand of claim 16, wherein the slider has a U-shaped profile comprising a first arm and a second arm connected by a core.

18. The device stand of claim 17, wherein the slider ramp comprises a first slider ramp disposed on the first arm and a second slider ramp disposed on the second arm.

19. The electronic device of claim 8, further comprising a plunger bias member to urge the plunger towards the lock position, the plunger bias member disposed opposite the interface side of the plunger.

20. The electronic device of claim 8, further comprising a slider bias member to urge the slider towards the resting position.

* * * * *